(12) United States Patent
Niemelä

(10) Patent No.: US 6,565,307 B1
(45) Date of Patent: May 20, 2003

(54) TRANSFER MACHINE

(75) Inventor: Jouko Niemelä, Tampere (FI)

(73) Assignee: Oy Meclift Ltd., Tampere (FI)

( * ) Notice: Subject to any disclaimer, the term of this patent is extended or adjusted under 35 U.S.C. 154(b) by 0 days.

(21) Appl. No.: 09/622,695

(22) PCT Filed: Feb. 2, 1999

(86) PCT No.: PCT/FI99/00069

§ 371 (c)(1),
(2), (4) Date: Aug. 21, 2000

(87) PCT Pub. No.: WO99/42323

PCT Pub. Date: Aug. 26, 1999

(30) Foreign Application Priority Data

Feb. 23, 1998 (FI) .................................................. 980400

(51) Int. Cl.⁷ .................................................. B60P 1/54
(52) U.S. Cl. ....................... 414/546; 414/555; 414/547; 414/549; 414/718; 212/264; 294/81.6
(58) Field of Search ................ 414/546, 547, 414/549, 552, 553, 555, 718, 732, 729, 680, 719, 728, 738; 212/260, 261, 259, 264; 294/81.62, 81.1, 81.6, 81.61

(56) References Cited

U.S. PATENT DOCUMENTS

| 2,353,655 | A | * | 7/1944 | Day ............................ 414/546 |
| 3,398,984 | A | | 8/1968 | Ajero et al. |
| 3,685,673 | A | | 8/1972 | Schweis |
| 3,770,309 | A | | 11/1973 | Merchant et al. |
| 3,884,321 | A | | 5/1975 | Drake et al. |
| 4,024,968 | A | | 5/1977 | Shaffer et al. |
| 4,245,941 | A | | 1/1981 | Charonnat |
| 5,022,810 | A | * | 6/1991 | Sherrow et al. ......... 414/546 X |
| 5,688,100 | A | * | 11/1997 | Wunder et al. ......... 414/555 X |

FOREIGN PATENT DOCUMENTS

| DE | 1 105 796 | | 4/1961 |
| DE | 195 16 357 A1 | | 12/1995 |
| EP | 0091977 | | 10/1983 |
| FR | 2 185 574 | | 1/1974 |
| JP | 0251253 | * | 11/1987 .................. 414/563 |
| WO | WO 97/27138 | | 7/1997 |

* cited by examiner

*Primary Examiner*—Frank E. Werner
(74) *Attorney, Agent, or Firm*—Connolly Bove Lodge & Hutz LLP

(57) ABSTRACT

Transfer machine, intended for transferring loads (K), especially containers, wherein the transfer machine comprises a frame (R) equipped with a wheelwork (P); a horizontal support plane (1) located in connection with the frame (R) for supporting the load (K) during the transfer, and a vertical transfer apparatus (S) for lifting the load (K) on the support of the support plane (1) and off the support of the support plane (1), wherein the vertical transfer apparatus (S) is arranged to lift and lower loads (K) from the side of the transfer machine and thereby from the side of the support plane (1). The vertical transfer apparatus (S) of the transfer machine is placed in connection with the frame (R) on the first side of the support plane (1), and the vertical transfer apparatus (S) is arranged to reach over the support plane when lifting or lowering the load (K), in order to move the load (K) onto the support plane (1) or off the support plane (1) from the second side of the support plane (1).

18 Claims, 4 Drawing Sheets

TRANSFER MACHINE

Figure 1:
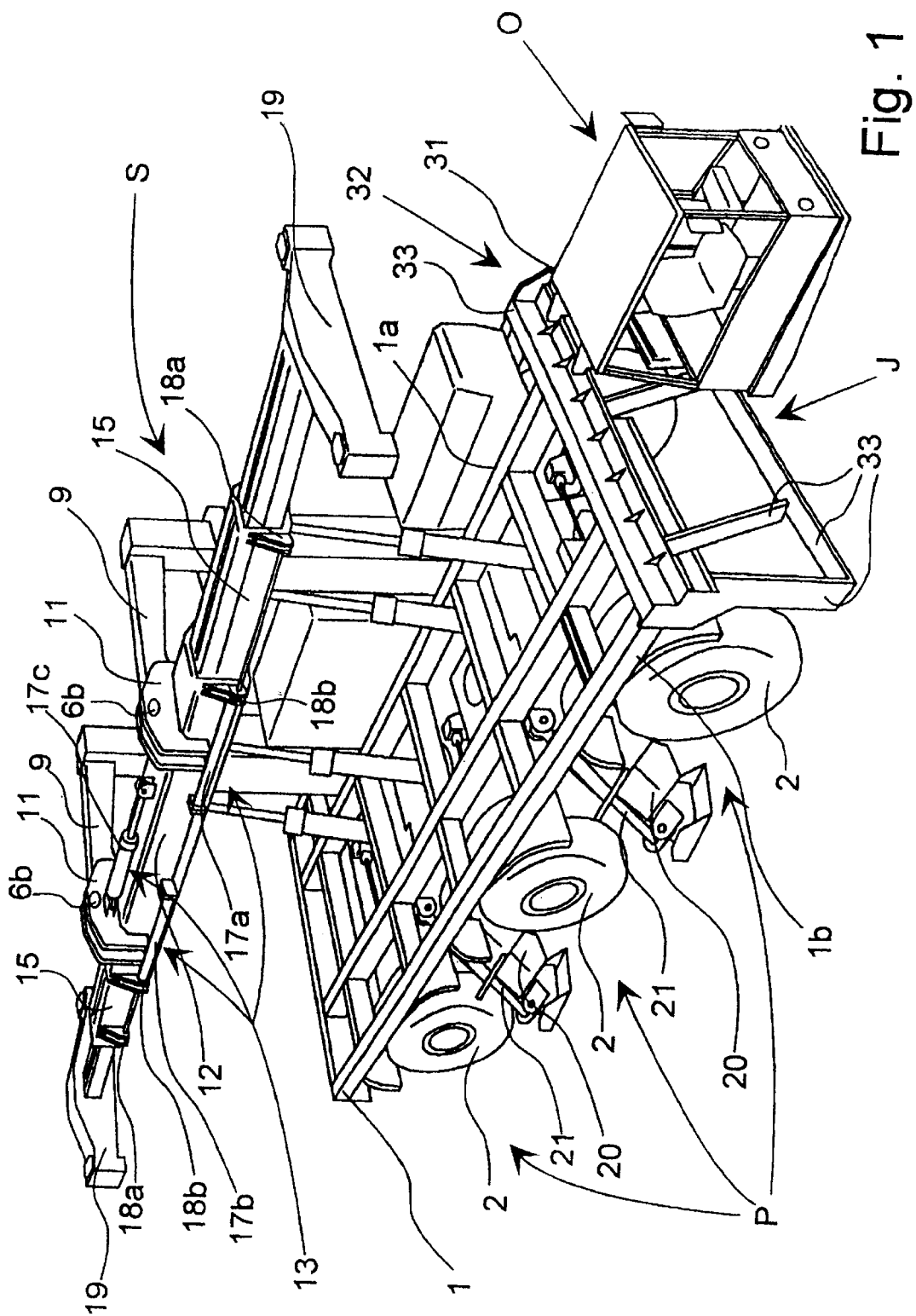

The invention relates to a transfer machine intented for transferring loads, especially containers. Hereinbelow, the term load can also be used to refer both to the load and to the container. The transfer machine comprises:
- a frame equipped with a wheelwork,
- a horizontal support plane in connection with the frame for supporting the load during transfer,
- a vertical transfer apparatus for lifting the load on and off the support of the support plane, wherein
- the vertical transfer apparatus is arranged to lift and lower loads from the side of the transfer machine and thereby from the side of the support plane.

A side reach type transfer machine of the above kind is disclosed for example in publication WO 97/26150. It is, however, difficult to implement the construction of the solution known from this publication especially because loads are arranged to be lifted in such a way that the stresses caused by the vertical transfer machine and by the load to be lifted or lowered are confined entirely to one side of the transfer machine at least at the stages of starting completing the transfers, wherein it is extremely difficult to balance the transfer machine.

The purpose of the present invention is to eliminate the aforementioned problems and to improve the state of art in the field. To attain these purposes, the transfer machine according to the invention is primarily characterized in that
- the vertical transfer apparatus is placed in connection with the frame at the first side of the support plane, and that
- the vertical transfer apparatus is arranged to reach over the support plane in order to move the load onto or off the support plane from the second side of the support plane.

The primary advantage of the above-presented solution is that when the load is lifted up or lowered down, all the heavy components and structures of the vertical transfer apparatus are located on the opposite side of the transfer machine with respect to the load. Thus, separate counterbalance weights are not required, and the construction balances the stresses caused by the load. When placed at the side of the support plane, the vertical transfer apparatus can be arranged in a considerably low position, which significantly lowers the centre of gravity in the transfer machine.

Furthermore, according to a preferred embodiment, the vertical transfer apparatus is supported to the axle group of the wheelwork. In this solution, loads not exceeding 30 tons, in weight can be lifted and lowered by means of the vertical transfer apparatus in such a way that the transfer machine is supported by the wheelwork. With heavier loads, especially those of 40 to 50 tons in weight, it is possible to use stabilizers, wherein the stress on the wheelwork remains at a moderate level.

Moreover, according to a preferred embodiment, grippers, or the like, which are arranged to grip the load, are adjustable in their position with respect to the longitudinal direction of the transfer machine, especially with the purpose of balancing the stress on the wheelwork and/or on the stabilizers. With this solution, the advantage is achieved that the stresses on the wheels and stabilizers of the transfer machine can be distributed evenly in an optimal manner when lifting and lowering the load, wherein it is possible to lift and lower the load safely.

The aforementioned arrangements for balancing the stress also increase the operating range of the machine for it is possible to provide the transfer machine with a considerably long vertical transfer apparatus. Thus, it is possible to manipulate for example several superimposed loads simultaneously or to collect a number of loads on top of each other.

With the structural solutions according to, the invention it is possible to produce a transfer machine which is suitable for use in a variety of locations and situations in an adaptable manner, thanks to the low centre of gravity, the considerably small dimensions especially with respect to the capacity, and the fact that load is manipulated from its side and transferred in its longitudinal direction.

The other dependent claims present some preferred embodiments of the transfer machine according to the invention.

Figure 2:
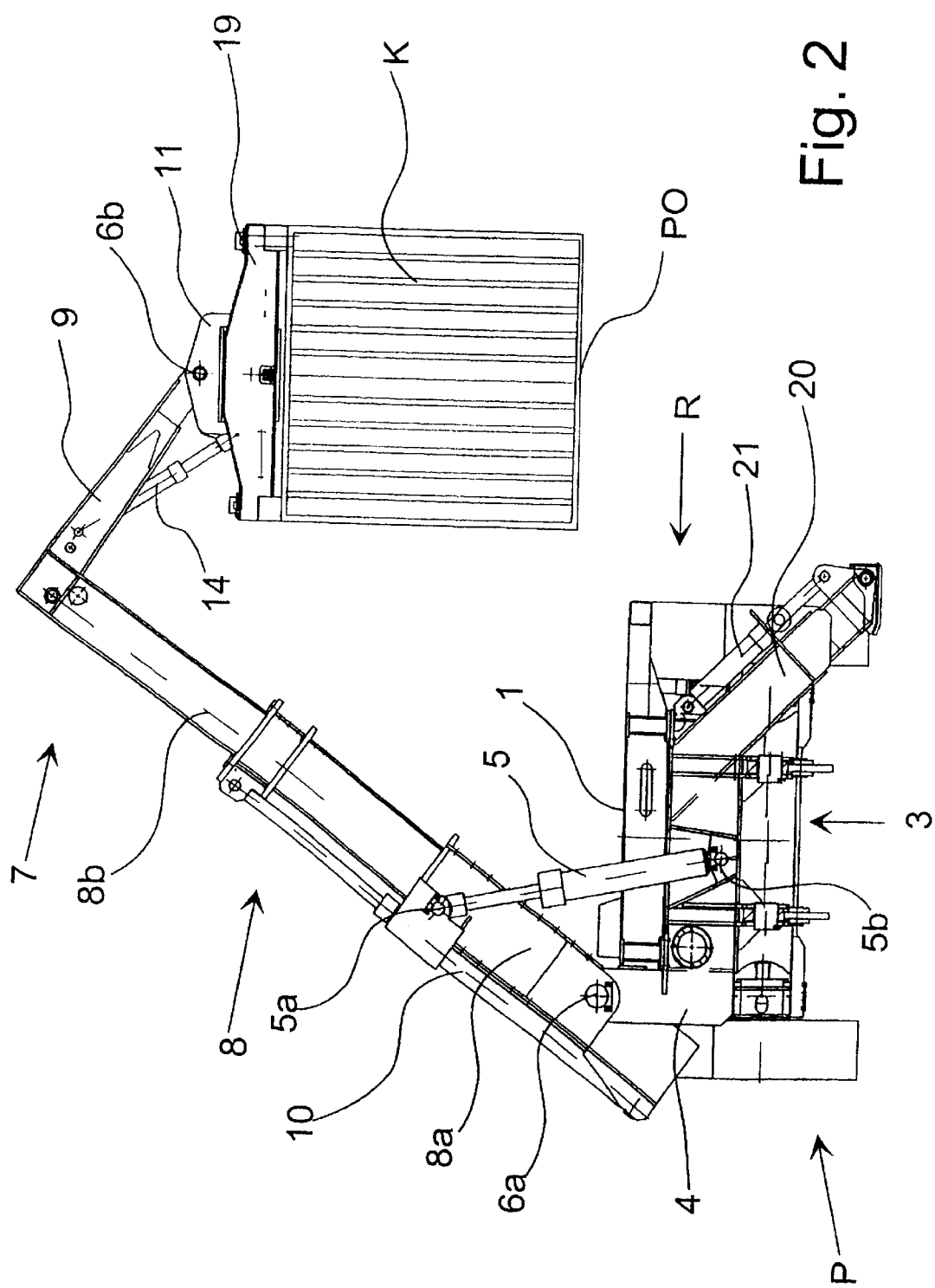
Figure 3:
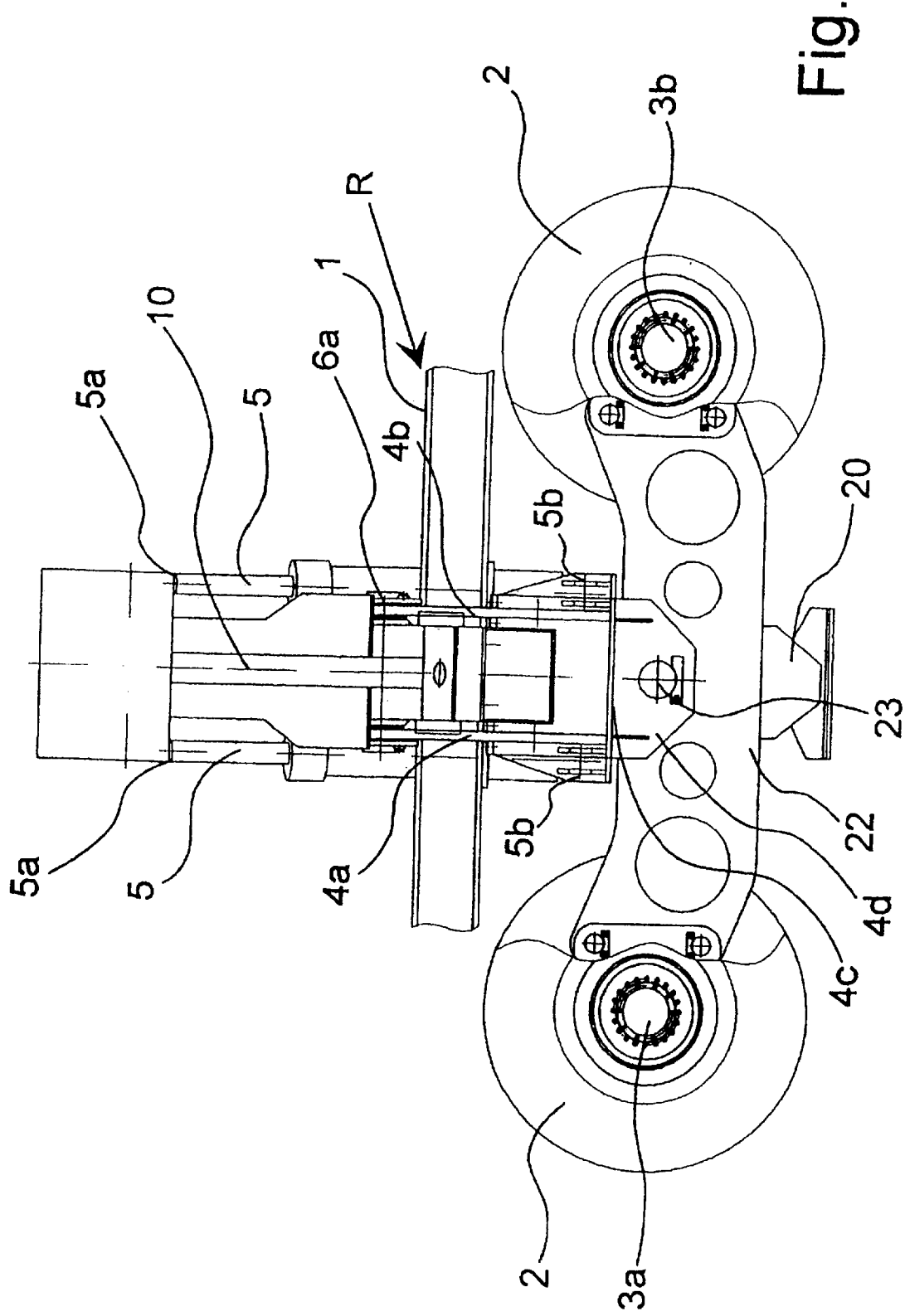
Figure 4:
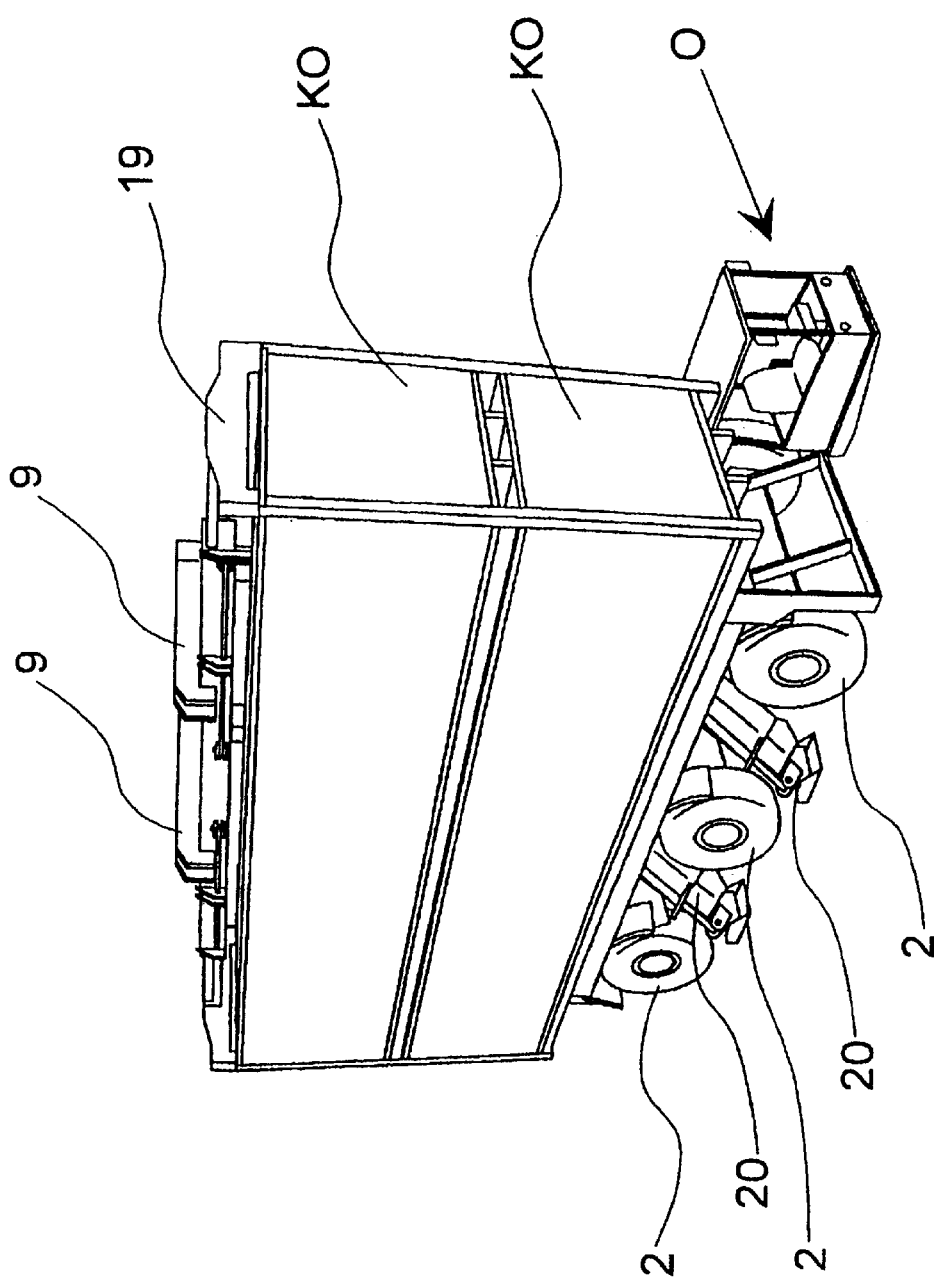

In the following description, the invention will be illustrated in more detail with reference to the appended drawings, in which FIG. 1 shows a perspective view of a transfer machine, FIG. 2 shows the transfer machine viewed from behind, FIG. 3 shows a side view of the junction between a bogie structure and a vertical transfer apparatus, and FIG. 4 shows a perspective view of the transfer machine in an operating situation.

FIGS. 1 and 2 illustrate the basic structure of the transfer machine according to the invention. The transfer machine comprises a frame R placed on the support of a wheelwork P, and provided with a vertical transfer apparatus S on its first longitudinal side. In connection with the frame R, substantially on top of it, a horizontal support plane 1, rectangular in shape when viewed from the top in the embodiment in question, is placed to support a load K (a container in the presented embodiment) during its transfer, and thus the vertical transfer apparatus S is located immediately outside the support plane 1 and thus outside the first longitudinal side 1a of the frame R, in parallel with its longitudinal direction, and reaches over the support plane and beyond the second longitudinal side 1b. The frame R and the support plane 1 are advantageously steel beam structures, or the like, which are assembled by welding.

The vertical transfer apparatus S is composed of two vertical supporting lug structures 4 (see also FIG. 3), or the like, fixed on the first side of the frame R, of two telescopic beams 7 or the like articulated thereto, and of first actuators 5 for swinging the telescopic beams 7 or the like in the vertical plane. The articulation between the supporting lugs 4a, 4b of the supporting lug structure 4 (FIG. 3) is generally marked with the reference number 6a. The supporting lug structures 4, or the like, as well as the actuators 5, are fixed and/or supported to the axle group 3 of the wheelwork P by means of a bogie structure 22 (FIG. 3), which lowers the centre of gravity in the transfer machine and substantially increases the stability of the transfer machine, enabling an optimal structure with respect to bearing capacity, for with respect to the strength of materials, the frame R and the support plane 1 can be dimensioned by considering substantially only the strength requirement s of the support of the load K.

The telescopic beam 7 is composed of two parts comprising a telescopic lower section 8 articulated to the supporting lug structure 4, or the like, and a transverse beam section 9 fixed in a stationary manner at the upper end of the lower section 8, preferably in a position perpendicular thereto, the transverse beam section 9 being directed above the support plane 1 from the upper part of the lower section 8, when the lower section 8 is in its upright position (FIG. 1). The actuation of the telescopic lower section 8 of the telescopic beam 7 is arranged by means of a second actuator 10 which affects the basic part 8a of the lower section 8, the basic part 8a being articulated (joint 6a) between the supporting lug structure 4 and an upper part 8b located inside the supporting lug structure 4 and moved by means of the second actuator 10 in the longitudinal direction of the basic part 8a. Between the free ends of the transverse beam sections 9 on the second side of the support plane 1, and on the support of suspension lugs 11 or the like, a connecting beam 12 is placed and provided with grippers 19 for gripping the load.

The grippers 19 and the connecting beam 12 which connects the telescopic beams 7 are joined together with lateral transfer means 13 in order to alter the horizontal distance between the grippers 19 and/or to move them simultaneously in the longitudinal direction of the transfer machine. The connecting beam 12 is articulated to the suspension lugs 11, or the like, at the ends of the transverse beams 9, in such a way that the load K hanging by the the grippers 19 remains in its substantially horizontal position, i.e. the bottom PO of the load is in horizontal position when the load is being lifted or lowered, and is placed in the correct lowering position substantially above the support plane 1 when the lower sections 8 of the telescopic beams 7 are in upright position. This articulation between the suspension lugs 11 and the connecting beam 12, is marked with the reference number 6b. Furthermore, between the transverse beam section 9 and the connecting beam 12, a third actuator 14 (FIG. 2) is arranged, by means of which the position of the load K is controlled when it is lifted or lowered. One end of the third actuator 14 can also be connected to the suspension lug 11 or the like.

It is obvious that the telescopic beams 7 can be arranged to function also as separate units irrespective of each other, and they can be provided with arrangements to alter their operating directions to deviate from the direction stretching over the support plane 1.

The lateral transfer means 13 for moving the grippers 19 are composed of two horizontal arms 15 which are arranged to move inside the connecting beam 12 and on its support in the longitudinal direction of the connecting beam 12, which horizontal arms 15 protrude from both ends of the connecting beam 12 and are provided with grippers 19 at their free ends. To alter the distance between the grippers 19, fourth actuators 17a, 17b (two actuators) be longing to the lateral transfer means 13 are placed between t he connecting beam 12 and the two horizontal arms, and fixed to lugs 18a, 18b located in the connecting beam 12 and horizontal arms.

In order to move the grippers 19 in the longitudinal direction of the transfer machine (when the distance between the grippers 19 is kept constant), the connecting beam 12 is articulated on the support of the suspension lugs 11. The connecting beam 12 is moved in the horizontal direction by means of a fifth actuator 17c which belongs to the lateral transfer means 13 and is placed between one suspension lug 11 and the connecting beam 12.

When gripping the load K, the distance between the grippers 19 and their common location in the longitudinal direction of the transfer machine can be manually adjusted from a cab O, but said adjustments of the grippers 19 can be advantageously implemented also by applying prior art, wherein sensors and control automation suitable in the application will be used.

It is obvious that the grippers 19 can also be different from those presented in the drawings and intended especially for gripping the container. In accordance with the load K to be transferred, the grippers 19 can be for example grip tongs, hooks, lifting ropes, or the like.

The transfer machine is controlled from the cab O. According to the presented preferred embodiment, the cab O is located in front of the transfer machine, ouside the frame R. The cab is arranged movable in both the lateral and the vertical direction, and to implement this, it is fixed to a guide arrangement J in the transverse direction of the transfer machine, the guide arrangement J, in turn, being fixed to the frame R. The guide arrangement J advantageously comprises at least one. horizontal guide 31 on the support of which the cab O is arranged, and at least one horizontal guide 32 (not shown) and necessary connecting and supporting parts 33. The movements of the cab are advantageously arranged to correspond to the movements of the load, which facilitates the work of the driver of the transfer machine and is implemented by applying control automation, which, as well as the guide arrangement, is prior art known as such.

The wheelwork P advantageously comprises at least six wheels 2 which are arranged in pairs of wheels on three successive axles of the axle group 3. At least the front and rear wheels 2 of the transfer machine are arranged to turn and drive, which reduces the turning radius of the transfer machine and thus improves its drivability. As for the capacity of the transfer machine, it is advantageous that at least one axle pair (the rear axle pair 3a, 3b, FIG. 3) is arranged as a bogie structure 22.

As can be seen in FIG. 3, the supporting lugs 4a, 4b used for fixing and articulating the telescopic beam 7, are fixed to a base plate 4c, or the like, located underneath the support plane 1, which base plate 4c, in turn, is articulated to, the bogie 22 located underneath the base plate 4c via a vertical plate structure 4d directed downwards from the bottom of the base plate 4c. FIG. 3 also shows the articulation 5a and 5b of the first actuator 5 (two hydraulic cylinder-piston combinations in connection with both telescopic beams 7) to the telescopic beam 7 and the frame R, respectively, wherein the lower articulation 5b is supported to the base plate 4c. Thus elevating forces are transmitted to the axle groups 3a, 3b via a joint 23 between the bogie 22 and the vertical plate structure 4d. As can be seen in FIG. 3, the telescopic beam 7 is partly fixed and supported underneath the support plane 1, especially for the part of the lower articulation 5b.

Especially when the load K is considerably heavy and/or it is necessary to reach for it far from the other side of the transfer machine, it is advantageous to use stabilizers 20 to support the transfer machine. There is at least one stabilizer 20, but advantageously a larger number of them, placed substantially between the axles, wherein in their functional position they protrude between the wheels 2 on the other side of the transfer machine to support the transfer machine. In their functional position, the stabilizers 20 advantageously extend substantially beyond the other side of the frame R. The operation of the stabilizers is arranged with sixth actuators 21 effective between the frame R and the telescopic stabilizers, by means of which actuators it is possible to lengthen and shorten the stabilizers. It is obvious that the transfers of the load K without the use of the stabilizers 20 can be prevented with an automatic arrangement when the load K exceeds a given weight limit, for example 25–30 tons. The stabilizers 20 can be fixed to the frame R, but they can also be fixed and/or supported to the axle group 3 of the wheelwork P.

The presented first, second, third, fourth, fifth and sixth actuators are preferably hydraulic piston-cylinder combinations, and prior art control techniques and corresponding technology is applied in their operation.

FIG. 4 presents a perspective view of a situation where two containers KO are placed on top of each other on the support plane 1 of the transfer machine.

What is claimed is:

1. Transfer machine, intended for the transfer of loads, comprising:
   a frame coupled to a wheelwork; and
   a horizontal support plane, coupled to the frame between a vertical transfer apparatus and a loading side of the transfer machine, for supporting a load during transfer; wherein,
   the vertical transfer apparatus comprises:
      a plurality of vertical supporting lugs, each lug located outwardly of and being fixed to the frame and coupled to a telescopic beam, the telescopic beam articulated to swing in the vertical plane by a swing actuator; and
      a horizontal connecting beam coupled to a plurality of grippers, for gripping and hanging the load, the connecting beam coupled articulately to a free end of the telescopic beam; wherein,
         the vertical transfer apparatus lifts and lowers the load, onto the support plane and off the support plane to the ground or a second load, from the loading side of the transfer machine which is also the loading side of the support plane,
         the vertical transfer apparatus is coupled to the frame and located on the opposite side of the support plane with respect to the load to be lifted, and
         the vertical transfer apparatus is arranged to reach over the support plane when lifting or lowering the load, in order to move the load onto or off the support plane.

2. Transfer machine according to claim 1, wherein the wheelwork comprises an axle group coupled to the vertical transfer apparatus.

3. Transfer machine according to claim 2, wherein the telescopic beams are composed of a telescopic lower section and a transverse beam section in such a way that the telescopic lower section is extended at its upper end with the transverse beam section, to which the connecting beam is fixedly articulated so that the load is placed on the support plane when the lower sections of the telescopic beams are in upright position.

4. Transfer machine according to claim 2, wherein the wheelwork comprises at least three axles, at least one axle pair arranged as a bogie structure, to which at least a part of the vertical transfer apparatus is supported.

5. Transfer machine according to claim 2, wherein the wheelwork comprises an axle group to which stabilizers are coupled, the stabilizers arranged to shorten and lengthen to support the transfer machine to the ground.

6. Transfer machine according to claim 1, wherein the positions of the grippers are adjusted by a lateral transfer mechanism, comprising:
   a plurality of lateral actuators, coupled between the connecting beam and one of the telescopic beams, arranged to simultaneously position each gripper, along an axis parallel to the longitudinal axis of the transfer machine, to balance stress, in the wheelwork, during the load transfer; and
   a plurality of horizontal actuators, coupled between each gripper and the connecting beam, to adjust the horizontal distance between the grippers.

7. Transfer machine according to claim 1, wherein the wheelwork further comprises an axle group, the axle group supporting the swing actuator, wherein a lower section of the swing actuator is supported underneath the support plane.

8. Transfer machine according to claim 1, wherein the telescopic beams are composed of a telescopic lower section and a transverse beam section in such a way that the telescopic lower section is extended at its upper end with the transverse beam section, to which the connecting beam is coupled articulately so that the load is placed on the support plane when the lower sections of the telescopic beams are in upright position.

9. Transfer machine according to claim 1, wherein the wheelwork comprises at least three axles, wherein at least one axle pair is arranged as a bogie structure, to which at least a part of the vertical transfer apparatus is supported.

10. Transfer machine according to claim 9, wherein at least outermost wheels of the wheelwork are arranged both to turn and to drive.

11. Transfer machine according to claim 1, further comprising a cab and a guide arrangement, the guide arrangement coupled between the cab and the frame wherein, the guide arrangement moves the cab in the lateral and the vertical directions such that the cab automatically remains off the travel path of the load.

12. Transfer machine according to claim 1, wherein at least outermost wheels of the wheelwork are arranged both to turn and to drive.

13. Transfer machine according to claim 1, wherein the wheelwork comprises an axle group to which stabilizers are supported, the stabilizers are arranged to shorten and lengthen for supporting the transfer machine to the ground.

14. Transfer machine according to claim 1, wherein the telescopic beams are composed of a telescopic lower section and a transverse beam section in such a way that the telescopic lower section is extended at its upper end with the transverse beam section, to which the connecting beam is fixedly articulated so that the load is placed on the support plane when the lower sections of the telescopic beams are in upright position.

15. The transfer machine according to claim 1, where the load is a container.

16. A transfer machine, intended for transferring loads, comprising:
   a frame coupled to a wheelwork;
   a horizontal support plane, coupled to the frame between a vertical transfer apparatus and a loading side of the transfer machine, for supporting a load during transfer; and
   wherein, the vertical transfer apparatus comprises:
      a plurality of vertical supporting lugs, each lug located outwardly of and being fixed to the frame and coupled to a telescopic beam, the telescopic beam articulated to swing in the vertical plane by a swing actuator;
      a horizontal connecting beam, coupled to a plurality of grippers to grip and hold the load, the connecting beam coupled articulately to a free end of the telescopic beam; and,
      the vertical transfer apparatus lifts and lowers the load, onto the support plane and off the support plane to the ground or a second load, from the loading side of the transfer machine which is also the loading side of the support plane,
      the vertical transfer apparatus is coupled to the frame and located on the opposite side of the support plane with respect to the load to be lifted,
      the vertical transfer apparatus is arranged to reach over the support plane when lifting or lowering the load, in order to move the load onto or off the support plane, and wherein,
         a lateral transfer mechanism positions each gripper, along a longitudinal axis parallel to the longitudinal axis of the transfer machine, during the transfer, to balance stresses on the wheelwork;

the lateral transfer machine comprising:
- at least one lateral actuator, effective between the connecting beam and one of the telescopic beams, the mechanism simultaneously moving each gripper along the longitudinal axis; and
- a plurality of horizontal actuators, effective between each of the grippers and the connecting beam, the horizontal actuators adjusting the horizontal distance between the grippers.

17. Transfer machine according to claim 16, wherein the wheelwork comprises an axle group, connected to the vertical transfer apparatus.

18. The transfer machine according to claim 16, where the load is a container.

* * * * *